United States Patent
Usami

(10) Patent No.: US 7,346,752 B2
(45) Date of Patent: Mar. 18, 2008

(54) MEMORY CONTROLLER AND IMAGE FORMING DEVICE PROVIDED WITH THE SAME

(75) Inventor: Hajime Usami, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 606 days.

(21) Appl. No.: 10/933,282

(22) Filed: Sep. 3, 2004

(65) Prior Publication Data

US 2005/0047231 A1 Mar. 3, 2005

(30) Foreign Application Priority Data

Sep. 3, 2003 (JP) .............................. 2003-311619

(51) Int. Cl.
*G06F 12/00* (2006.01)
(52) U.S. Cl. ...................................... 711/167; 711/154
(58) Field of Classification Search ................ 711/167, 711/169, 154; 365/233, 63, 201; 712/39; 348/441
See application file for complete search history.

(56) References Cited

U.S. PATENT DOCUMENTS

| | | | | |
|---|---|---|---|---|
| 5,784,704 A | * | 7/1998 | Sanemitsu | 711/164 |
| 6,125,431 A | * | 9/2000 | Kobayashi | 711/154 |
| 6,240,495 B1 | | 5/2001 | Usui et al. | |
| 6,330,627 B1 | * | 12/2001 | Toda | 710/104 |
| 6,763,448 B1 | * | 7/2004 | Mitsuishi | 712/39 |
| 6,876,395 B1 | * | 4/2005 | Muto et al. | 348/441 |
| 6,944,738 B2 | * | 9/2005 | Dong | 711/167 |
| 7,225,311 B2 | * | 5/2007 | Ware et al. | 711/167 |
| 2002/0039315 A1 | * | 4/2002 | Ooishi | 365/201 |
| 2004/0105292 A1 | * | 6/2004 | Matsui | 365/63 |

FOREIGN PATENT DOCUMENTS

| | | |
|---|---|---|
| JP | A-11-167515 | 6/1999 |
| JP | A-11-328004 | 11/1999 |
| JP | A-2000-280575 | 10/2000 |
| JP | A-2001-111745 | 4/2001 |
| JP | A-2002-182973 | 6/2002 |
| JP | A-2003-101806 | 4/2003 |

* cited by examiner

*Primary Examiner*—Pierre-Michel Bataille
(74) *Attorney, Agent, or Firm*—Oliff & Berridge, PLC

(57) ABSTRACT

In order to output an active command to an SDRAM, at time t0, output of a valid row address starts and a control signal ras# enters the active state. Thereafter, a control signal cs# enters the active state at time t1. At time t3, the signal cs# returns to the negative state. At time t4 when some period of time has passed after time t3, output of the valid row address stops and the signal ras# enters the negative state. Outputs of the address signal adr and the control signals ras#, cas# and we# are controlled in synchronization with a modulated clock S-clk, which is generated at the spread spectrum generator. This reduces the electromagnetic interference that is caused by the address signal adr and the control signals ras#, cas# and we#.

19 Claims, 7 Drawing Sheets

MEMORY CONTROLLER AND IMAGE FORMING DEVICE PROVIDED WITH THE SAME

BACKGROUND OF THE INVENTION

1. Field of the Invention

The present invention relates to a memory controller for controlling a synchronous memory and an image forming device provided with the memory controller.

2. Description of Related Art

Recent electric devices operate with the aid of a CPU of a personal computer (hereinafter referred to as "PC") or a CPU incorporated in a printer or the like. The CPU processes and controls a variety of data. Operating frequencies of the system clock (reference clock) in the CPUs are constantly increasing to increase the processing speed. However, higher clock frequencies result in generation of greater electromagnetic interference in the device. Electromagnetic interference has a negative effect on other operations in the device and on other electronic devices.

In electronic devices, electronic components and wirings connecting the electronic components generate electromagnetic interference. The electromagnetic interference may affect other electronic devices. For example, an electronic device provided with a CPU has a memory control system. The memory control system has a memory control circuit. The memory control circuit controls a synchronous memory based on instructions issued from the CPU. In the memory control system, the memory control circuit and the synchronous memory are located some distance apart from each other on a single printed circuit board and are interconnected with each other by the wiring pattern.

In the memory control system, the electromagnetic interference is generated from: control signal wires for transferring control signals from the memory control circuit to the synchronous memory in order to control the synchronous memory operation; address signal wires for transferring from the memory control circuit to the synchronous memory address signals which are outputted from the memory control circuit simultaneously with the control signals; data transmission wires; and clock signal transmission wires. Clock signals are almost always supplied to the memory control circuit, the synchronous memory, the CPU, and other components in the electronic device. For this reason, the clock signal transmission wires are a main source of electromagnetic interference.

Recently, modulated clocks are used as operating clocks to suppress electromagnetic interference. Modulated clocks are generated by Spread Spectrum Clock (SSC) technology. The SSC technology modulates the reference clock to spread and fall within a narrow band such that the modulated clock periodically changes its clock frequency by a few percent. The change in clock frequency suppresses the peak level of electromagnetic interference, as disclosed in Japanese patent application publication No. 2000-280575.

An SDRAM (Synchronous Dynamic RAM) is often used as a main memory in computers because the SDRAM is cheap and is capable of storing a large amount of data. The SDRAM receives several types of commands from the memory control circuit. More specifically, as each type of command, the SDRAM receives one or more kinds of control signals constructing the subject command and an address signal adr corresponding to the subject command. The SDRAM receives the control signals and the address signal adr in synchronization with the clock signal clk. For example, as shown in FIG. 1, the SDRAM receives a chip select signal cs# (control signal) and the address signal adr in synchronization with the clock signal clk. The symbol "#" appended to the signal name "cs" indicates that the subject signal is a negative logic (active row).

As shown in FIG. 1, the control signal cs# is in the active state only during one period of the clock signal clk, that is, one clock cycle's worth of time. The address signal adr is brought into a valid address signal corresponding to the command only when the control signal cs# is in the active state.

In this way, the memory control circuit outputs the control signal and address signal adr as a command to the SDRAM only during one clock cycle. The control of SDRAM as described above is described in Japanese patent application publication No. 2003-101806.

SUMMARY OF THE INVENTION

Recently, the clock signal that has the frequency of more than 100 MHz is used as the system clock in computers.

If, for example, the frequency of the clock signal clk is 100 MHz and, the control signal is in the active state (Low) during substantially one clock cycle and the address signal adr is valid during substantially one clock cycle as shown in FIG. 1, the frequency of the control signal in the active period and the frequency of the valid address signal become half the clock frequency, or substantially 50 MHz. The electromagnetic interference caused by a substantially 50 MHz frequency has a too high peak level to be ignored. Each time a command is outputted from the memory control circuit, control signals and address signals adr of substantially 50 MHz are repeatedly transferred from the memory control circuit to the SDRAM. This causes electromagnetic interference.

In Particular, the address signal adr (row address signal or column address signal) includes a plurality of bits and therefore is transferred by an address bus that includes a plurality of wires that correspond to the number of bits in the address signal. Recently, the address bus is configured from more than ten wires. When commands are outputted from the memory control circuit, valid address signals that have substantially half the clock frequency are transmitted through the multiple wires. Electromagnetic interference of a high level occurs from the address bus. The electromagnetic interference will adversely affect the operation of adjacent circuits.

In view of the above-described drawbacks, it is an object of the present invention to provide a memory controller, which can control a synchronous memory while reducing the electromagnetic interference and to provide an image forming device provided with the memory controller.

In order to attain the above and other objects, the present invention provides a memory controller for controlling a synchronous memory, the memory controller including: a reference clock generator; and a memory control portion. The reference clock generator generates reference clocks having a predetermined frequency. The memory control portion reads data from a synchronous memory in synchronization with the reference clocks in accordance with an instruction received from a CPU. The memory control portion includes: a control command generator; and an address signal generator. The control command generator outputs a control command to the synchronous memory during an output period of time. The address signal generator outputs an address signal to the synchronous memory during a first period of time, the first period of time including the output period of time and being longer than the output period of time.

According to another aspect, the present invention provides a memory device, including: a CPU; a synchronous memory operable in synchronization with external clocks; and a memory controller. The memory controller controls the synchronous memory. The memory controller includes: a reference clock generator; and a memory control portion. The reference clock generator generates reference clocks having a predetermined frequency. The memory control portion reads data from the synchronous memory in synchronization with the reference clocks in accordance with an instruction received from the CPU. The memory control portion includes: a control command generator; and an address signal generator. The control command generator outputs a control command to the synchronous memory during an output period of time. The address signal generator outputs an address signal to the synchronous memory during a first period of time, the first period of time including the output period of time and being longer than the output period of time.

According to another aspect, the present invention provides an image-forming device including: a CPU: an input portion; a synchronous RAM; a memory controller; and an image forming unit. The input portion receives image data from an external device. The synchronous RAM operates in synchronization with external clocks and receives the image data. The memory controller writes the image data into the synchronous RAM in accordance with an instruction received from the CPU. The image forming unit forms images on a recording medium based on the image data. The memory controller includes: a reference clock generator; and a memory control portion. The memory control portion writes data to and reads data from the synchronous RAM in synchronization with the reference clocks in accordance with an instruction received from the CPU. The memory control portion includes: a control command generator; and an address signal generator. The control command generator outputs a control command to the synchronous memory during an output period of time. The address signal generator outputs an address signal to the synchronous RAM during a first period of time, the first period of time including the output period of time and being longer than the output period of time.

DETAILED DESCRIPTION OF THE PREFERRED EMBODIMENT

Figure 1:
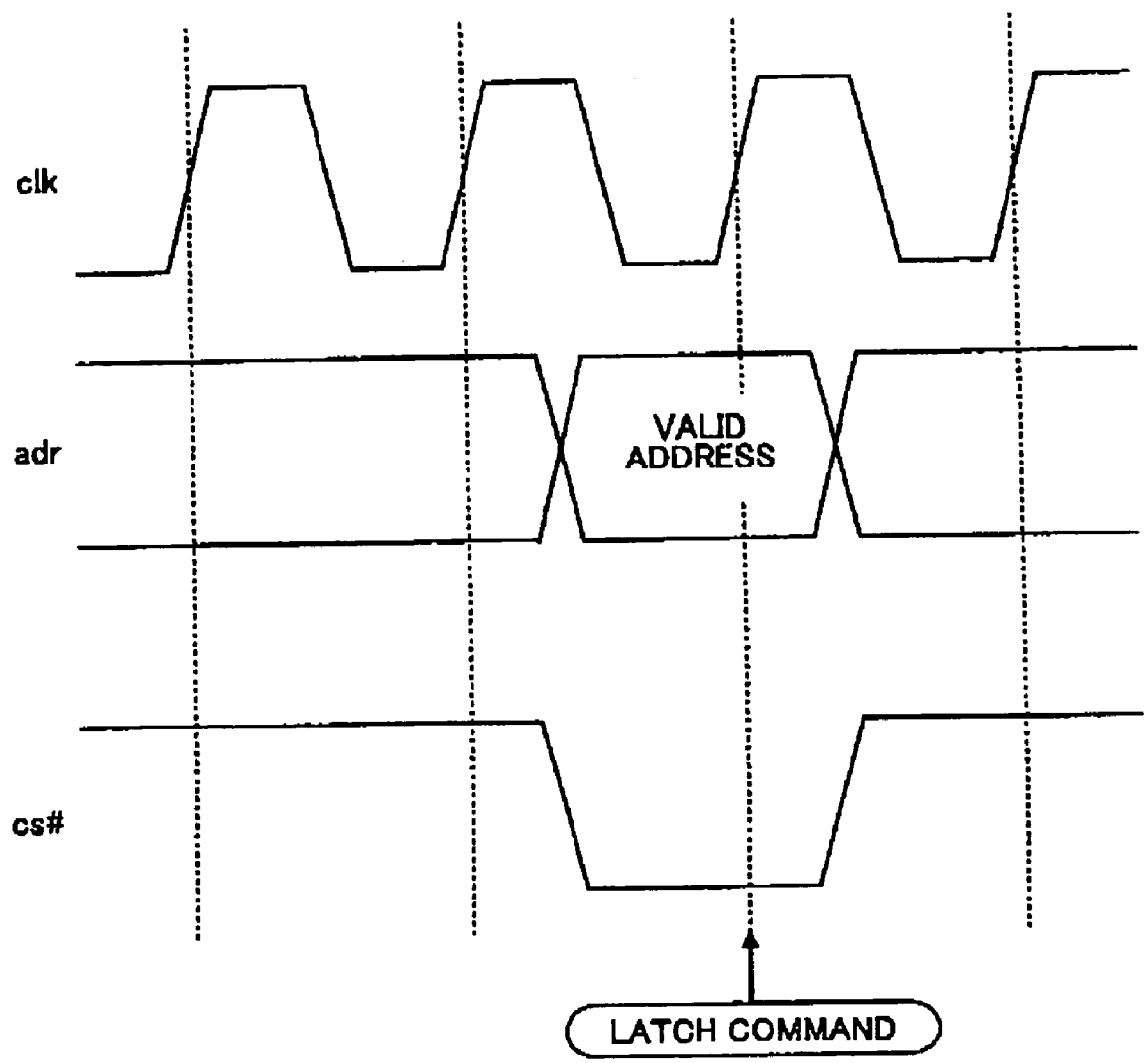
FIG. 1 is a time chart illustrating the relationship between clock, an address signal, and a control signal cs# for control of an SDRAM.

A memory controller and an image forming device equipped with the same according to a preferred embodiment of the present invention will be described while referring to the accompanying drawings wherein like parts and components are designated by the same reference numerals to avoid duplicating description.

A memory controller and a printer according to the preferred embodiment of the invention will be described while referring to the accompanying drawings.

Figure 2:
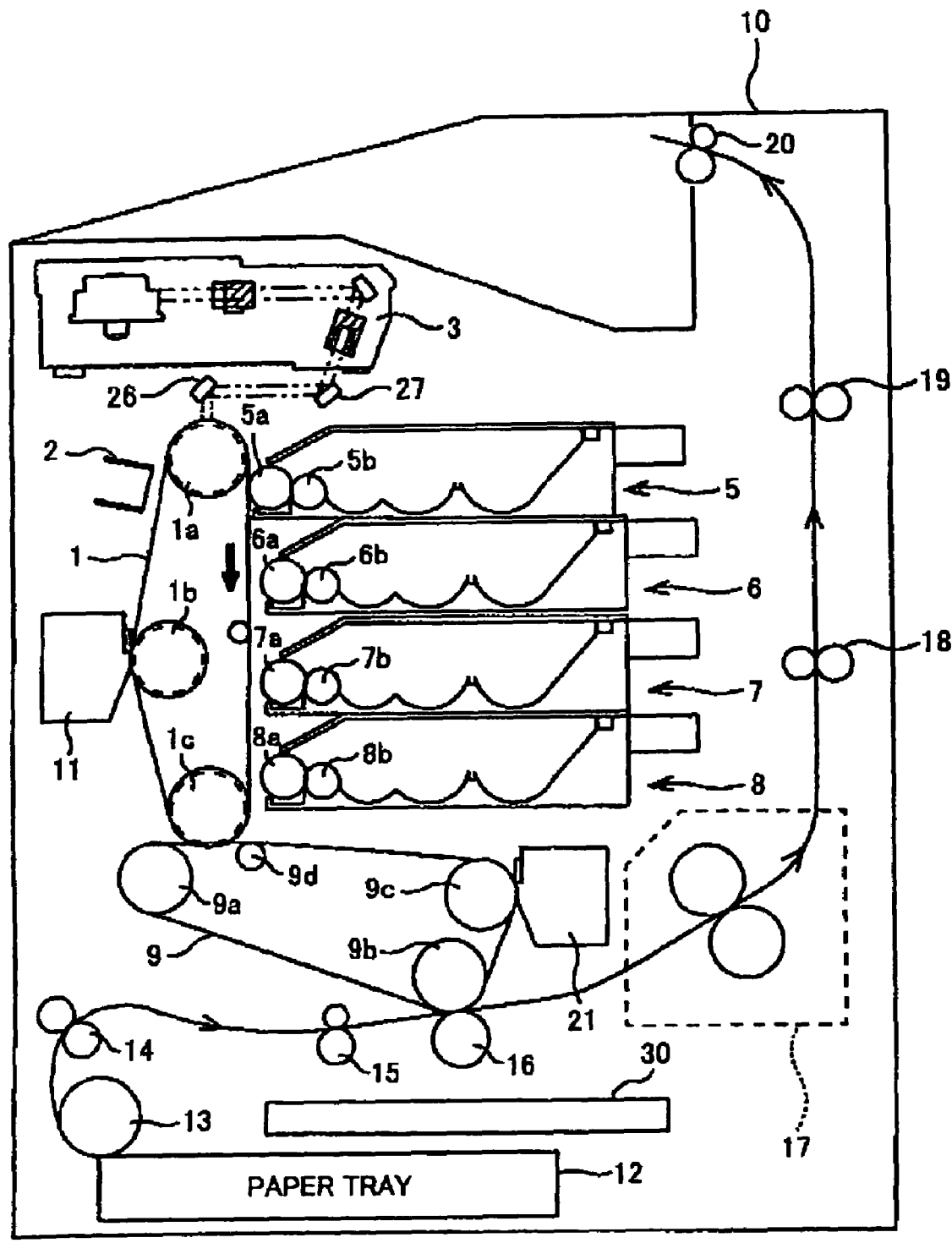
FIG. 2 is an explanatory diagram showing the overall configuration of a printer according to an embodiment of the present invention.

FIG. 2 is an explanatory drawing showing the overall configuration of a printer according to the embodiment of the invention. As shown in FIG. 2, the printer 10 includes a photosensitive belt 1, a photosensitive belt support rollers 1a-1c, a charging device 2, a laser unit 3, first to fourth developing units 5-8, an intermediate transfer belt 9, intermediate transfer belt support rollers 9a-9d, a photosensitive belt cleaning unit 11, a paper tray 12, a feed roller 13, conveying rollers 14 and 15, a transfer roller 16, a thermal fixing unit 17, discharge rollers 18-20, an intermediate transfer belt cleaning unit 21, mirrors 26 and 27, and a main substrate 30. The main substrate 30 is disposed above the paper tray 12.

The photosensitive belt 1 is an endless and flexible image bearing member mounted over the photosensitive belt support rollers 1a-1c under tension. The photosensitive belt support rollers 1a-1c are rotated clockwise by a drive motor (not shown), and the rollers 1a-1c rotate the photosensitive belt 1 clockwise.

The charging device 2 is located in opposition to the photosensitive belt 1 and uniformly charges the photosensitive belt 1 that is driven to rotate around the rollers 1a-1c. The laser unit 3 includes a laser light source and a polygon mirror, and irradiates a laser beam modulated in accordance with color image data onto the photosensitive belt 1 via the mirrors 27 and 26, thereby forming electrostatic latent images on the photosensitive belt 1. The color image data is input to the printer 10 from a PC 40 (FIG. 3) to be described later.

The first to fourth developing units 5-8 are disposed at one side of the photosensitive belt 1. Each of the four developing units 5-8 includes a developing roller 5a, 6a, 7a, 8a and a supply roller 5b, 6b, 7b, 8b. Although not shown in the drawings, each of the developing units 5-8 further includes a doctor blade and an agitator. The doctor blade regulates the thickness of a toner layer on the surface of the developing roller 5a-8a to adjust the amount of toner supplied to the photosensitive belt 1. The agitator agitates the toner. The developing units 5-8 each hold a different color toner (developer), i.e., yellow, cyan, magenta, and black toner. The toner supply roller 5b-8b supplies toner to the associated developing roller 5a-8a.

The intermediate transfer belt 9 is an endless, flexible image bearing member which is mounted over the intermediate transfer belt support rollers 9a, 9b, 9c, and 9d under tension. The intermediate transfer belt 9 rotates counter-clockwise while contacting the photosensitive belt 1. A bias is applied to the intermediate transfer belt 9 so that toner is transferred from the photosensitive belt 1 to the intermediate transfer belt 9.

The photosensitive belt cleaning unit 11 is disposed in contact with the photosensitive belt 1 and downstream of the developing units 5-8 with respect to the direction in which the photosensitive belt 1 rotates. The cleaning unit 11 is provided to remove toner remaining on the photosensitive belt 1.

The transfer roller 16 is rotatably disposed while contacting the intermediate transfer belt 9 with a printing paper interposed therebetween. A bias is applied to the transfer roller 16 to transfer toner images to the printing paper. The paper tray 12, the feed roller 13, the conveying rollers 14 and 15 are located along a paper transportation path and upstream of the transfer roller 16. The faxing unit 17 and the discharge rollers 18-20 are located along the paper transportation path and downstream of the transfer roller 16.

The intermediate transfer belt cleaning unit 21 is disposed while contacting the intermediate transfer belt 9 and removes toner remaining on the intermediate transfer belt 9.

During operation, the photosensitive belt 1 is rotated clockwise, and the charging device 2 uniformly charges the photosensitive belt 1. Then the laser beam from the laser unit 3 is irradiated onto the photosensitive belt 1 via the mirrors 27 and 26, thereby forming an electrostatic latent image on the photosensitive belt 1. The first developing unit 5 develops the latent image with toner contained therein. Specifically, the first developing unit 5 moves toward the photosensitive belt 1 until the developing roller 5a is brought into contact with the photosensitive belt 1. The rotating developing roller 5a conveys the toner to the surface of the photosensitive belt 1, thereby developing the electrostatic latent image on the photosensitive belt 1 and forming a toner image thereon. The toner image thus formed on the photosensitive belt 1 is moved downward and transferred to the intermediate transfer belt 9.

When the development of the latent image by the first developing unit 5 ends, the toner remaining on the photosensitive belt 1 is removed by the photosensitive belt cleaning unit 11. Then the charging device 2 charges the photosensitive belt 1, and the laser unit 3 forms on the photosensitive belt 1 an electrostatic latent image according to the color image data that the second developing unit 6 will develop.

Next, the first developing unit 5 moves away from the photosensitive belt 1 while the second developing unit 6 moves toward the photosensitive belt 1 and the associated developing roller 6a is brought into contact with the photosensitive belt 1. Thus the electrostatic latent image on the photosensitive belt 1 is developed by the toner in the second developing unit 6. Next, the toner on the photosensitive belt 1 is transferred to the intermediate transfer belt 9.

In the same manner, the developing roller 7a of the third developing unit 7 and the developing roller 8a of the fourth developing unit 8 consecutively contact the photosensitive belt 1 to develop the latent images with the toner from the developing units 7 and 8. After each development, the toner images are transferred to the intermediate transfer belt 9 after which the photosensitive belt cleaning unit 11 removes any toner still remaining on the photosensitive belt 1.

When the development by the developing units 5-8 and transfer of the toner images to the intermediate transfer belt 9 are completed, a full color toner image is formed on the intermediate transfer belt 9. A bias is then applied to the transfer roller 16 to transfer the toner image to the printing paper fed from the paper tray 12 via the feed roller 13 and the conveying rollers 14 and 15. After the transferred toner image is fixed by the fixing unit 17, the discharge rollers 18-20 guide the printing paper out of the printer 10. After the image has been transferred to the printing paper, the intermediate transfer belt cleaning unit 21 removes the toner remaining on the intermediate transfer belt 9.

Figure 3:
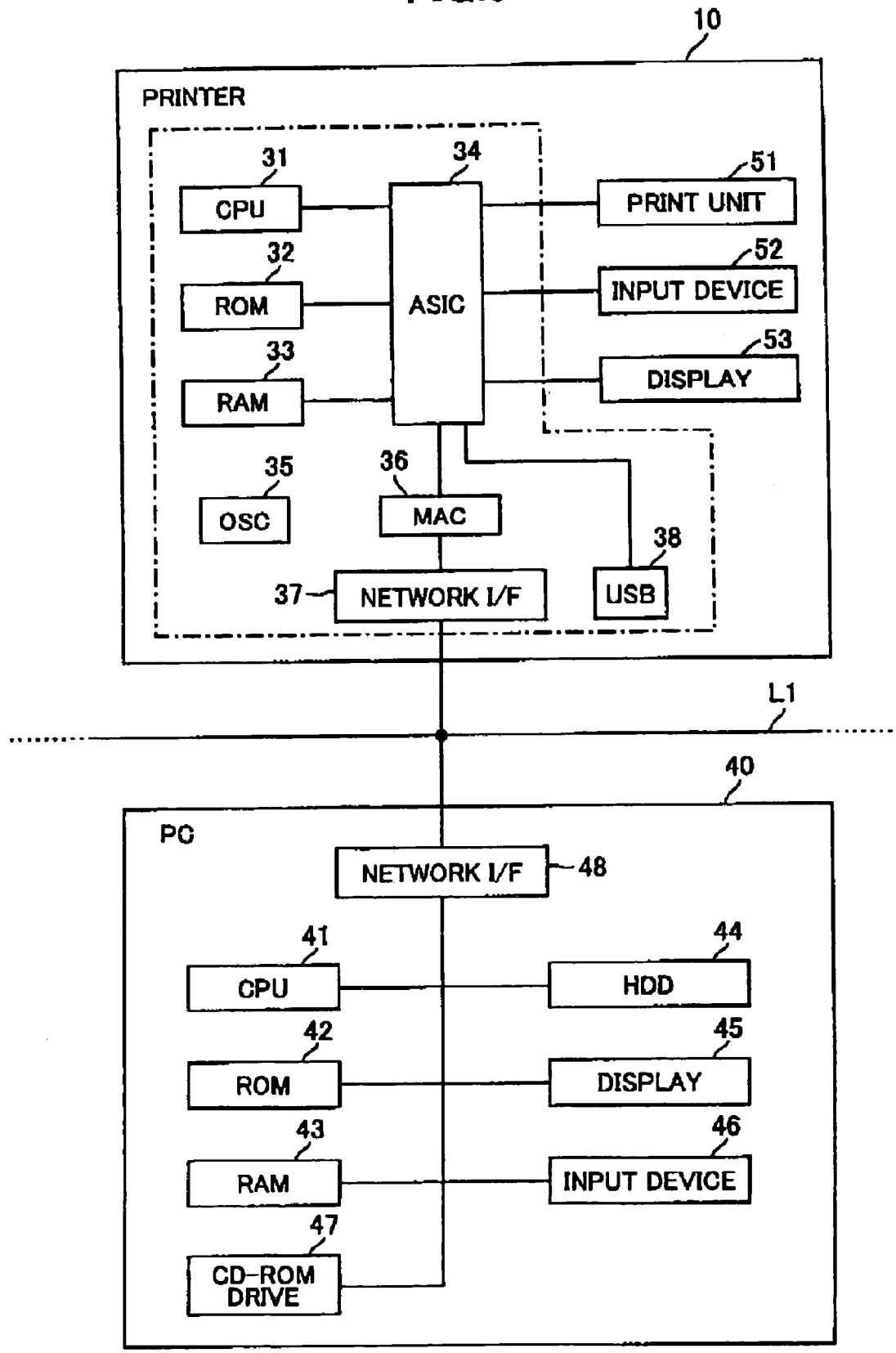
FIG. 3 is a block-diagram showing the overall configuration of a network printing system according to the embodiment of the present invention.

Next, a network printing system according to the embodiment of the invention will be described while referring to FIG. 3. FIG. 3 is an explanatory diagram showing the overall configuration of the network printing system. The network printing system includes the printer 10 and the PC 40 that are interconnected via a network transmission line L1. Color image data is supplied to the printer 10 from the PC 40, and the printer 10 prints a color image on a printing paper based on the color image data supplied from the PC 40.

The printer 10 includes a CPU 31, a ROM 32, a RAM 33, and an ASIC 34. The CPU 31 governs the entire operation of the printer 10. The ROM 32 stores parameters and programs to be executed by the CPU 31. The RAM 33 stores color image data and other data transferred from the PC 40 and is used as a temporary work area of the CPU 31. The ASIC 34 outputs control signals to the units connected thereto (other than the CPU 31 and the ASIC 34) based on commands received from the CPU 31.

The printer 10 further includes an oscillator 35, a MAC chip 36, a network interface 37, a USB terminal 38, a print unit 51, an input device 52, and a display 53. The oscillator 35 generates reference clocks for synchronization of the components contained in the printer 10. The MAC chip 36 processes data, such as MAC addresses, contained in MAC (Media Access Control) frames input or output via the network transmission line L1. The network interface 37 transmits data between the printer 10 and other external devices. The USB terminal 38 is a data input/output port in compliance with a USB (Universal Serial Bus) standard. The print unit 51 prints out color images on the printing paper based on externally input color image data.

More specifically, the print unit 51 includes the laser unit 3, the photosensitive belt 1, the developing units 5-8, the intermediate transfer belt 9, the fixing unit 17 and other components in the printer 10 shown in FIG. 2 as well as an engine substrate (not shown) that outputs control and drive signals to these components of the print unit 51 is according to control signals output from the ASIC 34.

The input device 52 allows the user to effect various settings of the printer 10. The display 53 visibly indicates the result of settings entered through the input device 52, printer status information, and other information on printer operation.

Figure 4:
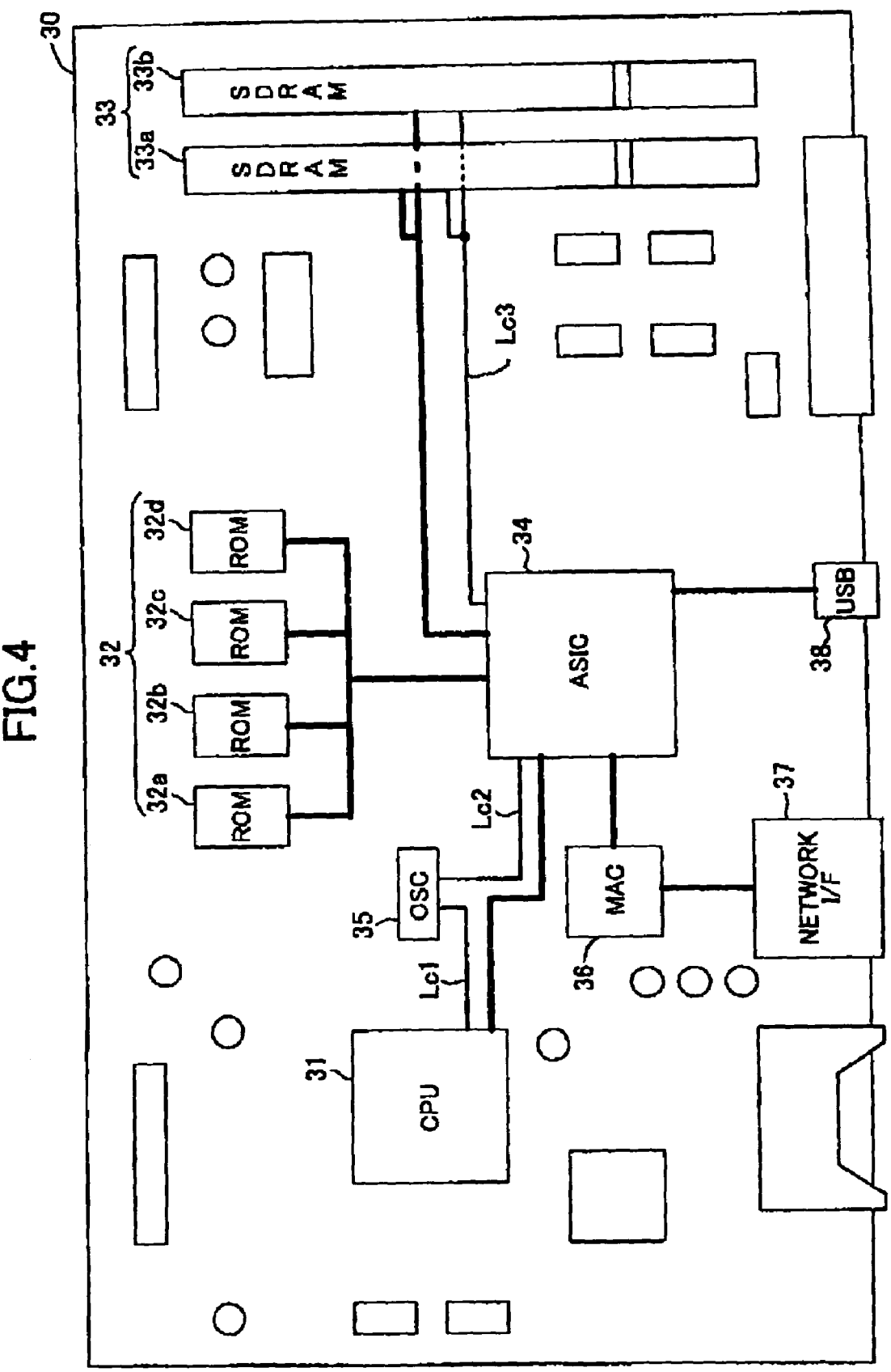
FIG. 4 is an explanatory diagram showing components mounted on a main substrate of the printer of FIG. 2.

The components encircled by a dot-and-dash line in FIG. 3, that is, the CPU 31, the ROM 32, the RAM 33, the ASIC 34, the oscillator 35, the MAC chip 36, the network interface 37, and the USB terminal 38 are, as shown in FIG. 4, mounted on the main substrate 30. The ROM 32 is made up of a plurality of ROM chips (four ROM chips 32a, 32b, 32c, and 32d, in this example). In this embodiment, an SDRAM is used as the RAM 33. More specifically, an SDRAM module (DIMM) is used as the RAM 33, on which a plurality of SDRAM chips 33a and 33b are mounted.

As described hereinabove, the oscillator 35 and the CPU 31 are connected with the reference clock supply line Lc1 while the oscillator 35 and the ASIC 34 are connected with the reference clock supply line Lc2. Also, in this embodiment, the ASIC 34 and the SDRAM 33 are connected with another reference clock supply line Lc3. The SDRAM 33 is also supplied with the reference clocks.

Referring back to FIG. 3, the PC 40 is an ordinary PC provided with a CPU 41, a ROM 42, a RAM 43, a hard disk drive (HDD) 44, an LCD display 45, a keyboard or other input device 46, a CD-ROM drive 47, and a network interface 48. Document data, color image data, and other print data generated using applications installed on the PC 40 can be output in response to print commands to the printer 10 via the network interface 48 and the network transmission line L1. The print unit 51 converts the print data input via the network transmission line L1 to printable data, which is then printed by the printer 10.

Figure 5:
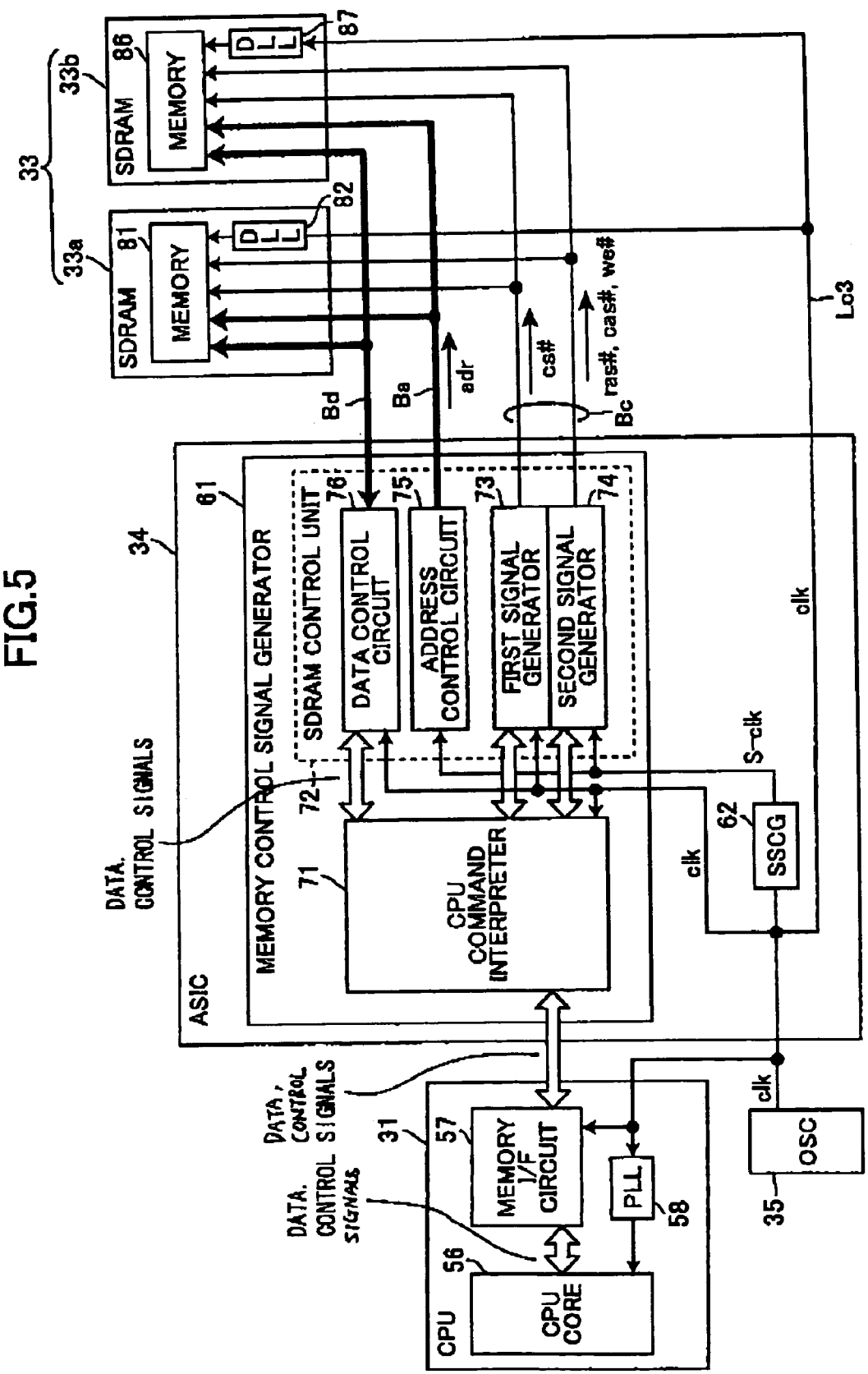
FIG. 5 is a block-diagram showing the overall configuration of an SDRAM control system according to the embodiment of the present invention.

Next, an SDRAM control system in the printer 10 will be described with reference to FIG. 5. FIG. 5 is an explanatory diagram showing the overall configuration of the SDRAM control system in the printer 10.

An SDRAM control system of the printer 10 includes the CPU 31, the ASIC 34, the SDRAM 33, and the oscillator 35. The oscillator 35 is a well-known clock generator that generates reference clocks clk with a constant frequency (100 MHz in this embodiment). The reference clocks clk generated by the oscillator 35 are input to the CPU 31 and the ASIC 34. The reference clocks clk are also input to the SDRAM 33 via the ASIC 34.

The CPU 31 is provided with a CPU core 56, a memory interface (I/F) circuit 57, and a PLL circuit 58. The CPU core 56 executes various processes based on programs stored in the ROM 32. The memory interface circuit 57 operates as an interface for the various data and control signals that are transferred between a memory control signal generator 61 in the ASIC 34 and the CPU core 56. The PLL circuit 58 multiplies (for example to 1 GHz) the reference clocks clk input from the oscillator 35. While the CPU 31 uses the reference clocks clk as the operating clocks, the CPU core 56 actually uses the high-frequency clocks that are multiplied by the PLL circuit 58 as the operating clocks.

The ASIC 34 is provided with the memory control signal generator 61 and a spread spectrum clock generator (SSCG) 62. The memory control signal generator 61 performs a variety of controls of SDRAM 33 based on instructions (control signals) from the CPU 31. The SSCG 62 uses SSC to modulate the reference clocks clk input from the oscillator 35 to generate modulated clocks S-clk.

The SSCG 62 modulates the reference clocks clk (100 MHz) within a narrow band to generate modulated clocks S-clk. The frequency of the modulated clocks S-clk changes periodically within a predetermined frequency range that includes the frequency (100 MHz) of the reference clocks clk and that ranges from 99 to 101 MHz. The modulated clocks S-clk and the reference clocks clk are input into the memory control signal generator 61.

As stated earlier, the SDRAM 33 includes two SDRAM modules 33a and 33b. The SDRAM module 33a includes a memory unit 81, which includes a plurality of SDRAM chips. The SDRAM module 33a further includes a DLL (Delay Locked Loop) circuit 82. The DLL circuit 82 is for delaying the reference clock clk inputted from the ASIC 34, before supplying the reference clock clk to the memory unit 81. The DLL circuit 82 performs a feedback control to adjust or change the phase of the reference clock clk supplied from the ASIC 34 so that the phase of the reference clock clk will be maintained or locked at the same phase with the phase of the internal clock in the SDRAM 33a. Accordingly, the SDRAM 33a can input control signals and data from the ASIC 34 to the memory unit 81 in synchronization with the reference clock signals clk and can output data from the memory unit 81 to the ASIC 34 in synchronization with the reference clock signals clk.

Similarly to the SDRAM module 33a, the SDRAM module 33b includes a memory unit 86, which includes a plurality of SDRAM chips, and further includes a DLL circuit 87. The DLL circuit 87 has the same configuration with the DLL circuit 82.

The memory control signal generator 61 controls reading of data from the SDRAM 33 and writing of data into the SDRAM 33 based on instructions from the CPU 31. More specifically, the memory control signal generator 61 outputs control signals cs#, ras#, cas#, and we# and an address signal adr to the SDRAM 33 according to instructions from the CPU 31. The memory control signal generator 61 outputs control signals to the CPU 31 when required. The SDRAM 33 operates according to the control signals cs#, ras#, cas#, and we# and the address signal adr issued from the memory control signal generator 61. The memory control signal generator 61 is designed also to relay data between the CPU 31 and SDRAM 33. Accordingly, the memory control signal generator 61 and SDRAM 33 are connected with each other via a control bus Bc to transfer control signals therebetween, an address bus Ba to transfer address signals adr therebetween, and a data bus Bd to transfer data therebetween.

The memory control signal generator 61 includes a CPU command interpreter 71 and an SDRAM control unit 72. The CPU command interpreter 71 decodes the control signals from the CPU 31 and determines whether these signals are control signals or data for the SDRAM 33. The contents of the control signals intended for the SDRAM control are transferred to the SDRAM control unit 72. The SDRAM control unit 72 generates control signals and the address signals for controlling the SDRAM 33 according to the content of the CPU 31 commands and outputs the resulting signals to the SDRAM 33. The SDRAM 33 interprets the commands based on the control signals and reads (or writes) data based on command content and the assigned address.

An overview of the SDRAM 33 operation will be given below. As stated above, various control signals from the SDRAM control unit 72 are applied to the SDRAM 33. These control signals include a chip selector signal (cs#), a row address strobe signal (ras#), a column address strobe signal (cas#), and a write enable signal (we#). The SDRAM control unit 72 uses a combination of cs#, ras#, cas# and we# control signals to designate a command to the SDRAM 33. The symbol "#" appended to the signal name indicates negative logic (active row).

These commands can set a burst length (BL), a CAS latency (CL), and other SDRAM 33 operation modes. The burst length indicates the number of bits in a continuous data output (or input) in burst mode. The CAS latency indicates the number of clock cycles (see FIG. 6) from the input of a read command until start of a data read operation.

The SDRAM 33 latches the cs#, ras#, cas#, and we# signals and interprets the command in coincidence with the rising edge of the reference clocks clk fed from the reference clock supply line Lc3. An active command, a read command, a write command, a precharge command, and a mode register setting command are examples of typical commands. The active command is a command when both cs# and ras# are LOW and both cas# and we# are HIGH. The read commands is a command when both cs# and cas# are LOW and other control signals are HIGH. The write command is a command when cs#, cas# and we# are LOW and ras# is HIGH. The precharge command is a command when cs#, ras#, and we# are LOW and cas# is HIGH. The mode register setting command is the command when control signals cs#, ras#, cas# and we# are all LOW. The above burst length and CAS latency are specified when the address signal is set to a predetermined logic level when the mode register setting command is output. Description of commands other than those described above is omitted herein since the commands including the above-described commands are all well-known SDRAM control commands.

The SDRAM control unit 72 is for outputting commands (control signals and address signals) to the SDRAM 33. The SDRAM control unit 72 includes a first signal generator 73, a second signal generator 74, an address control circuit 75, and a data control circuit 76.

The first signal generator 73 is for outputting a control signal cs# to the SDRAM 33 based on instructions issued from the CPU 31. The control signal cs# is for determining the duration of output of the corresponding command (valid period). More specifically, when the control signal cs# is in the active state (Low level), the other remaining three control signals ras#, cas#, and we# become valid, thereby making valid the corresponding command.

The second signal generator 74 is for outputting other remaining three control signals ras#, cas#, and we# to the SDRAM 33 based on instructions issued from the CPU 31.

In order to output a command to the SDRAM 33 according to an instruction from the CPU 31, the address control circuit 75 outputs a valid address (address signal adr) that corresponds to the subject command. The valid address (address signal adr) indicates an address in the SDRAM 33, from which data is to be read or into which data is to be written.

It is noted that because the chip selector signal cs# is a signal that determines the duration of command output period (valid period), it is necessary to set the chip selector signal cs# in an active state for the period of one clock cycle only. The address signal adr and the control signals cas#, ras#, and we# become valid only when cs# is in the active state.

The data control circuit 76 controls output of data from and input of data to SDRAM 33 according to an instruction issued from the CPU 31.

According to the present embodiment, the first signal generator 73 and the data control circuit 76 operate in synchronization with the reference clock clk. The second signal generator 74 and the address control circuit 75 operate in synchronization with the modulated clock S-clk.

In order to output a command to the SDRAM 33, among the control signals ras#, cas#, and we#, one or more control signals ras#, cas#, and/or we# that correspond to the subject command has to be made active to indicate the subject command. The second signal generator 74 brings into the active state the control signals ras#, cas#, and/or we# that correspond to the subject command, before the first signal generator 73 brings the control signal cs# into the active state. The second signal generator 74 returns the control signals ras#, cas#, and/or we# from the active to the negative after the first signal generator 73 returns the control signal cs# from the active to the negative. Thus, the period of time, during which the second signal generator 74 sets the control signals ras#, cas#, and/or we# in the active, is longer than the period of time, during which the first signal generator 73 sets the control signal cs# in the active.

For example, in order to output a write command, control signals cs#, cas#, and we# should be set to an active state. Accordingly, the second signal generator 74 brings the control signals cas# and we# into the active state before the first signal generator 73 brings the control signal cs# into the active state. The second signal generator 74 returns the control signals cas# and we# back to the negative state, after the first signal generator 73 returns the control signal cs# back to the negative.

Similarly, with respect to the address signal adr, in order to output a command to the SDRAM 33, the address control circuit 75 outputs the valid address (valid row address or valid column address), before the first signal generator 73 brings the control signal cs# into the active state. The address control circuit 75 stops outputting the valid address (valid row address or valid column address), after the first signal generator 73 returns the control signal cs# from the active to the negative. Thus, the period of time, during which the address control circuit 75 outputs the valid address, is longer than the period of time, during which the first signal generator 73 sets the control signal cs# in the active.

For example, in order to output a write command, the address control circuit 75 outputs the valid column address before the first signal generator 73 brings the control signal cs# into the active state. The address control circuit 75 stops outputting the valid column address after the first signal generator 73 returns the control signal cs# back to the negative.

Figure 6:
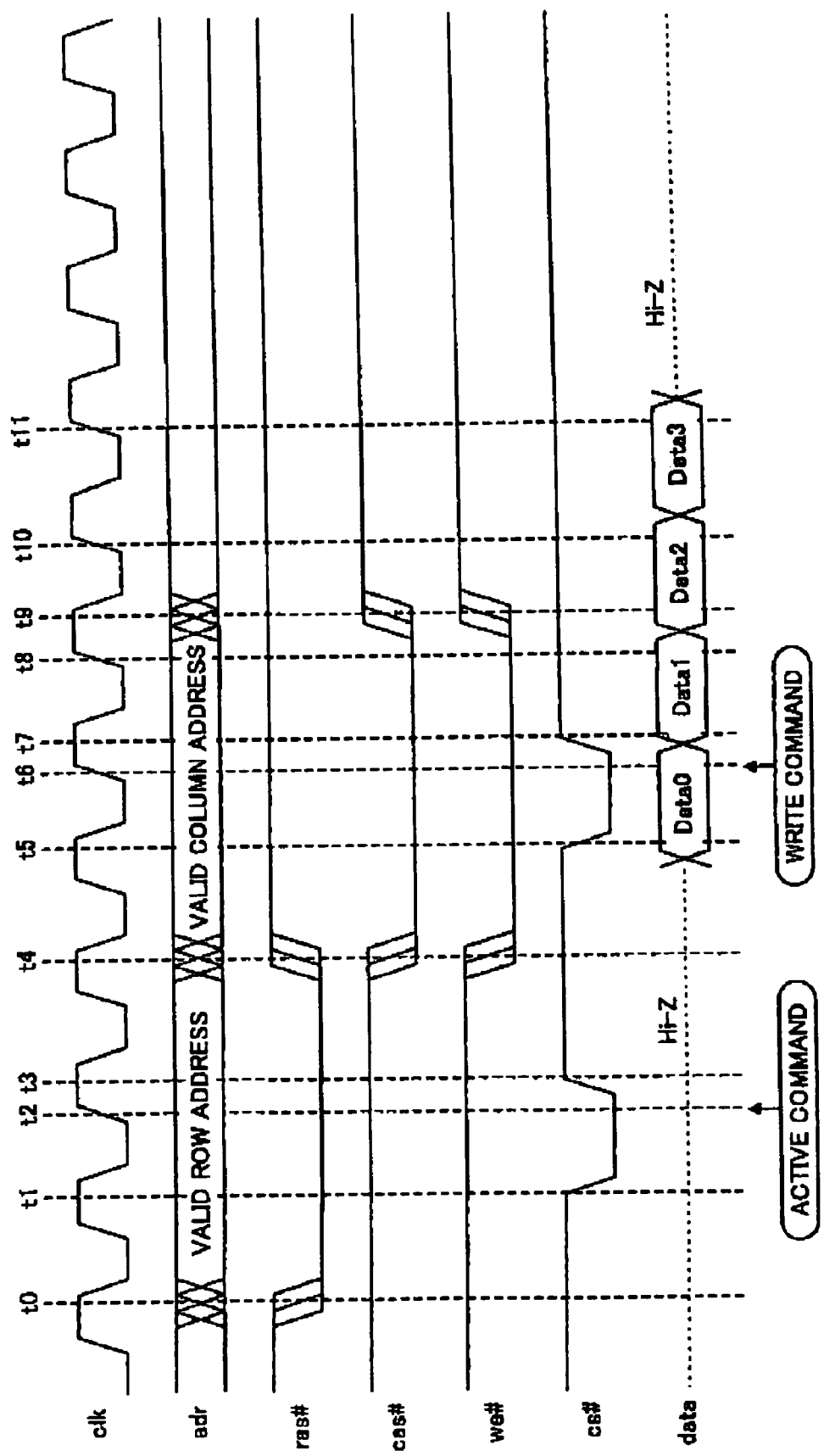
FIG. 6 is a time chart showing an example of control during a write operation.
Figure 7:
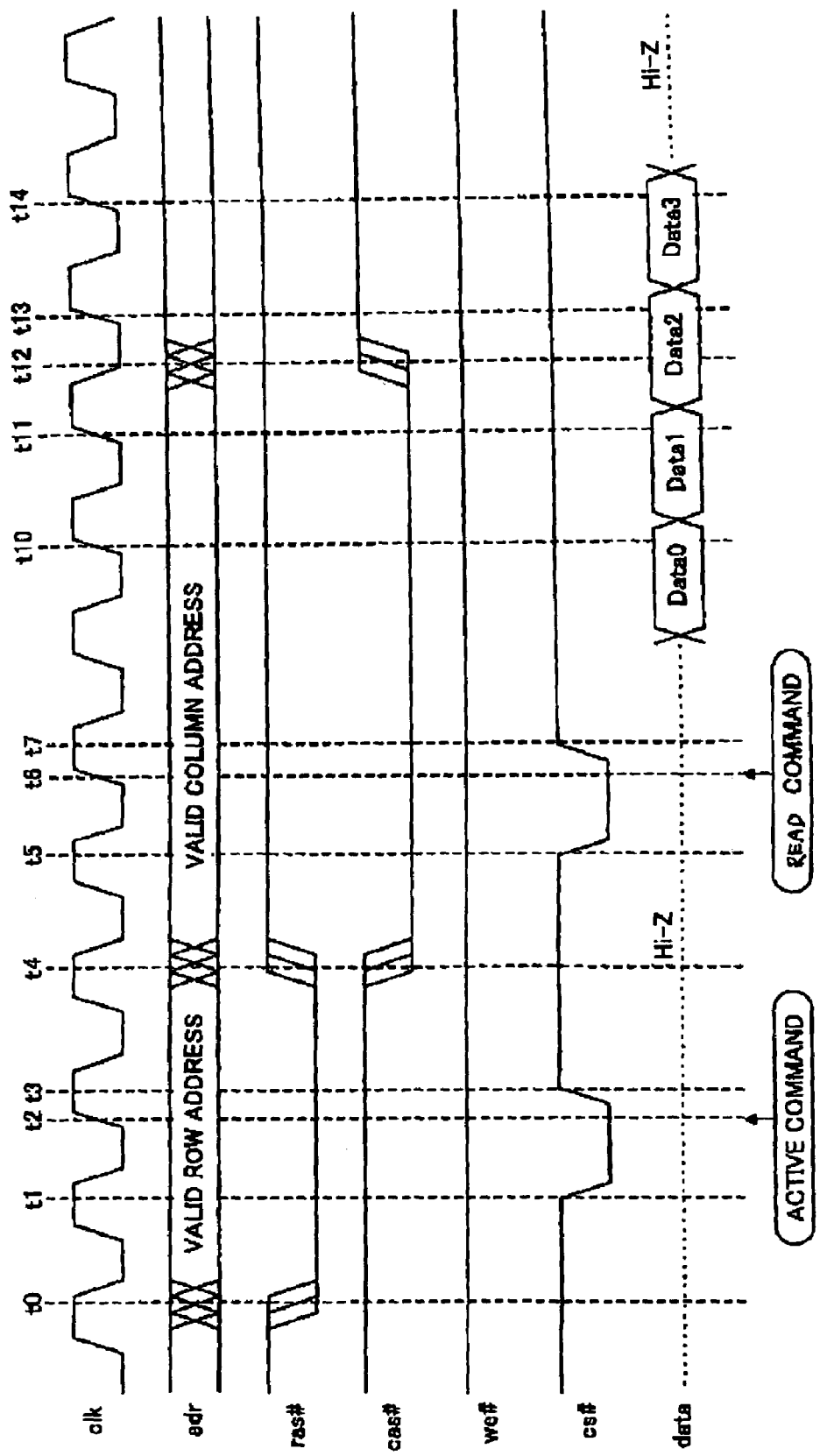
FIG. 7 is a time chart showing an example of control during a read operation.

With reference to FIG. 6 and FIG. 7, next will be described how the SDRAM control system controls the SDRAM 33.

FIG. 6 is a timing chart showing how the SDRAM control system executes a writing operation to write data in the SDRAM 33. In this example, the burst length BL is set to four (4).

As shown in FIG. 6, when the CPU 31 instructs the SDRAM control unit 72 to output an active command to the SDRAM 33, the SDRAM control unit 72 sets the control signals cs# and ras# to the active state (Low level). The SDRAM control unit 72 sets the signals cs# and ras# to the active state at different timings. The SDRAM control unit 72 brings the control signal ras# into the active state at time t0. The SDRAM control unit 72 brings the control signal cs# into the active state at time t1. The time t0 is prior to the time t1 by a period of the reference clock clk (one reference clock cycle). The SDRAM control unit 72 starts outputting a valid address (a valid row address) of the address signal adr at the same time when the SDRAM control unit 72 enters the control signal ras# into the active state.

In this way, the control signal cs# enters the active state at time t1. Thereafter, the reference clock signal clk rises at time t2. The SDRAM 33 latches the control signals and the valid row address on the rising edge of the clock signal. The SDRAM 33 interprets the content of the received command based on the latched signals, and recognizes that the received command is an active command.

The control signal cs# maintains its active state substantially for a period of the reference clock clk (one reference clock cycle), and thereafter returns to the negative state at time t3. The control signal ras# remains in the active state until time t4. The output of the valid row address also continues until time t4.

In this way, in order to output an active command to an SDRAM, at time t0, output of the valid row address starts and the control signal ras# enters the active state. Thereafter, the control signal cs# enters the active state at time t1. At time t3, the signal cs# returns to the negative state. At time t4 when some period of time has passed after time t3, output of the valid row address stops and the signal ras# enters the negative state.

The SDRAM control unit 72 outputs a write command to the SDRAM 33 a predetermined period of time after outputting the active command. The SDRAM control unit 72 sets the write command by bringing the control signals cs#, cas# and we# into the active state. More specifically, the SDRAM control unit 72 sets the control signals cas# and we# to the active state at time t4, and thereafter sets the control signal cs# to the active state at time t5. The SDRAM control unit 72 starts outputting a valid address (valid column address) of the address signal adr at the same time when the SDRAM control unit 72 sets the control signals cas# and we# to the active state.

In this way, the control signal cs# enters the active state at time t5. Thereafter, the reference clock clk rises at time t6. The SDRAM 33 latches the control signals and the column addresses on the rising edge of the clock signal. The SDRAM 33 interprets the content of the received command based on the latched signals, and recognizes that the command is a write command.

Also at time t5, the data control circuit 76 starts outputting write data (Data 0 to Data 3) to the SDRAM 33. This data (Data 0) is latched at time t6. The SDRAM 33 writes Data 0 according to the received write command. The address, to which data is to be written in the SDRAM 33, is determined by the valid row address latched at time t2 and the valid column address latched at time t6.

Thereafter, at time t7, the control signal cs# returns to the negative state. Since the burst length BL in this embodiment is set to four (4) as described above, the SDRAM 33 latches the remaining three sets of data consecutively in synchronization with the reference clock clk. More specifically, Data 1 is latched at time t8, Data 2 is latched at time t10, and Data 3 is latched at time t11.

The control signals cas# and we# maintain the active state after cs# returns to the negative state at time t7. Then, at time t9, the control signals cas# and we# return to the negative state.

It is noted that each of the timings t0, t4 and t9 is not fixed but varies within a predetermined range. This is because the address control circuit 75 outputs the address signal adr in synchronization with the modulated clock S-clk, and because the second signal generator 74 outputs the control signals ras#, cas#, and we# in synchronization with the modulated clock S-clk.

As described above, according to the present embodiment, the output period (t0 to t4), during which the valid row address for the active command is outputted, is longer than the active period (t1 to t3), during which the control signal cs# for the active command is in an active state. The output period (t4 to t9), during which the valid column address for the write command is outputted, is longer than the active period (t5 to t7), during which the control signal cs# for the write command is in an active state. The timing of outputting each address is in synchronization with the modulated clock S-clk.

Similarly, the active period (t0 to t4), during which the control signal ras# for the active command is in the active state, is longer than the active period (t1 to t3), during which the control signal cs# for the active command is in an active state. The active period (t4 to t9), during which the control signals cas# and we# for the write command are in the active state, is longer than the active period (t5 to t7), during which the control signal cs# for the write command is in an active state. The timing of outputting each signal cas#, we# is in synchronization with the modulated clock S-clk. For example, the SDRAM control unit 72 sets the control signal ras# to the active state (t0) before setting the control signal cs# to an active state (t1), and sets the control signal ras# to the negative state (t4) after setting the control signal cs# to a negative state (t3). The timing of transitions between the active and negative states for the control signals ras#, cas#, and we# are in synchronization with the modulated clock S-clk.

FIG. 7 is a timing chart showing how the SDRAM control system executes a reading operation to read data from the SDRAM 33. In this example, the burst length BL is set to four (4) and the CAS latency is two (2).

As shown in FIG. 7, the timings when the SDRAM control unit 72 outputs the signals for the read operation are basically the same as the timings when the SDRAM control unit 72 outputs the signals for the write operation shown in FIG. 6.

More specifically, the timings (t0 to t4) when the SDRAM control unit 72 outputs the active control signals cs# and ras# and the valid row address for the active command are exactly the same as the timings (t0 to t4) when the SDRAM control unit 72 outputs the active control signals cs# and ras# and the valid row address for the active command shown in FIG. 6.

For the read command, the control signal we# never enters the active state. However, similarly to the timings shown in FIG. 6, at timing t4, the SDRAM control unit 72 returns the control signal ras# to the negative state and sets the control signal cas# to the active state and outputs the valid column address for the read command. At timing t5, the SDRAM control unit 72 sets the control signal cs# to the active state. At timing t6, the SDRAM control unit 72 returns the control signal cs# to the negative state.

The read command is latched at time t6. At time t10, that is, two clock cycles' worth of period of time after time t6, data is consecutively read from the SDRAM 33. This is because the CAS latency is set to 2. Data 0 to Data 3 is read one per clock cycle starting from time t10. That is, Data 0 is read at time t10, Data 1 is read at time t11, Data 2 is read at time t13, and Data 3 is read at time t14.

The valid column address, whose output starts at time t4, and the control signal cas#, that enters the active state also at time t4, maintain their corresponding states until time t12. At time t12, the output of the valid column address stops and simultaneously the signal cas# returns to the negative state.

As described above, according to the present embodiment, in order to output a command to the SDRAM 33, among the control signals ras#, cas# and we#, the memory control signal generator 61 sets those control signals, which have to be set to the active state to indicate the subject command, to the active state during such a period that is longer than a period during which the memory control signal generator 61 sets the control signal cs# to the active state. Similarly, in order to output a command to SDRAM 33, the memory control signal generator 61 outputs a valid address (valid row address or valid column address) that corresponds to the command to the SDRAM 33 during such a period that is longer than the period during which the memory control signal generator 61 sets the control signal cs# to the active state. As a result, the frequency of the control signals ras#, cas# and we# and the address signal adr become low, which reduces the amount of electromagnetic interference that these signals generate.

Additionally, the timings to, t4, t9, t12 when the control signals ras#, cas#, we# change between the active state and the negative state and the output of the address signals starts and stops are not fixed but vary within the predetermined ranges. This is because outputs of the address signal adr and the control signals ras#, cas# and we# are controlled in synchronization with the modulated clock S-clk, which is generated at the spread spectrum clock generator 62. This reduces the electromagnetic interference that is caused by the address signal adr and the control signals ras#, cas# and we#. It is therefore possible to further reduce the height of the electromagnetic interference peak level. It is possible to further lower the overall electromagnetic interference in the printer 10.

Additionally, the control signals ras#, cas# and we# enter the active state and the output of the valid address starts at the timing prior to the timing when the control signal cs# enters the active state. The output of the valid address stops and the control signals ras#, cas# and we# return from the active state to the negative state when some period of time has elapsed after the control signal cs# has returned to the negative state. In this example, the control signal cs# enters the active state at timing t1, that is, when substantially one clock cycle's worth of time has passed after the timing t0 when the output of the valid row address has started and the control signal ras# has entered the active state. The output of the valid row address stops and the control signal ras# returns to the negative state at timing t4, that is, when substantially one clock cycle's worth of time has passed after the timing t3 when the control signal cs# has returned to the negative state. This ensures sufficiently long periods of time to set up and to hold the valid address and the control signals corresponding to the command. It is possible to highly reliably control the SDRAM 33.

In addition, the burst length for data read and write operations can be set for the SDRAM 33. As the burst length increases, it is possible to increase the period of time, during which the corresponding control signals (ras#, cas#, and/or we#) are in the active state, and to increase the period of time, during which the corresponding valid address (valid row address or valid column address) is outputted. More specifically, while a plurality of successive sets of word data are being read and until the next control command is outputted, the memory control signal generator 61 can continue maintaining the corresponding control signals (ras#, cas#, and/or we#) in the active state and can continue outputting the corresponding valid address (valid row address or valid column address). This further reduces electromagnetic interference.

The printer 10 according to the present embodiment is a color printer capable of forming color images based on color image data. Because the amount of color image data is larger than the amount of monochrome image data. Accordingly, the printer 10 requires SDRAM having a large amount of capacity, and therefore requires a large number of wirings for transmitting the address signal and the control signals. However, by controlling the SDRAM 33 in the above-described manner, it is possible to reduce electromagnetic interference, thereby enabling accurate control of large amount of color image data and highly accurate printing of color images.

While the invention has been described in detail with reference to the specific embodiment thereof, it would be apparent to those skilled in the art that various changes and modifications may be made therein without departing from the spirit of the invention.

For example, in the above-described embodiment, the active periods of the control signals ras#, cas# and/or we# for some command are set relative to the active period of the control signal cs# for the subject command so that the active periods of the control signals ras#, cas# and/or we# start before the active period of the control signal cs# starts and so that the active periods of the control signals ras#, cas# and/or we# end after the active period of the control signal cas# ends. This ensures that the control signals ras#, cas# and/or we# remain in the active state while the control signal cs# is in the active state. However, the active periods of the control signals ras#, cast and/or we# can be set in other various manners relative to the active period of the control signal cs# to allow the control signals ras#, cas# and/or we# to remain in the active state while the control signal cs# is in the active state. For example, it is possible to bring the corresponding control signals ras#, cas# and/or we# into the active state simultaneously when the control signal cs# enters the active state and to return the control signals ras#, cas# and/or we# to the negative state after the control signal cs# returns to the negative state. It is also possible to enter the control signal ras#, cas# and/or we# into the active state before the control signal cs# enters the active state and to return the control signals ras#, cas# and/or we# to the negative state simultaneously when the control signal cs# returns to the negative state. It is possible to increase the lengths of the active periods of the control signals ras#, cas#, and/or we# as long as the signals ras#, cas# and/or we# do not interfere with the signals ras#, cas#, and/or we# for the previous or the following command.

Similarly, in the above-described embodiment, the output period of the valid address for some command is set relative to the active period of the control signal cs# for the subject command so that the output period of the valid address starts before the active period of the control signal cs# starts and so that the output period of the valid address ends after the active period of the control signal cs# ends. This ensures that the output of the valid address continues while the control signal cs# is in the active state. However, the output period of the valid address can be set relative to the active period of the control signal cs# in other various manners to allow the output of the valid address to continue while the control signal cs# is in the active state. For example, it is possible to start the output of the valid address simultaneously when the control signal cs# enters the active state and to stop the output of the valid address after the control signal cs# returns to the negative state. It is also possible to start the output of the valid address before the control signal cs# enters the active state and to stop the output of the valid address simultaneously when the control signal cs# returns to the negative state.

In the above-described embodiment, the second signal generator 74 and the address control circuit 75 operate in synchronization with the modulated clock S-clk. However, the second signal generator 74 and the address control circuit 75 may operate in synchronization with the reference clock clk instead.

The SDRAM 33 is used as a synchronous memory in the above-described embodiment. However, for example, DDR-SDRAM (Double Data Rate SDRAM), Rambus (registered trademark) R-DRAM, and DRAM of similar types could be used instead. Many other types of synchronous memory could be used instead of DRAM. For example, synchronous SRAM (SSRAM) and synchronous ROM (SROM), which could be often used as cache memory, are examples of the other types of synchronous memory.

In place of the DLL circuit, various types of device that can adjust the phase of the reference clock inputted to the SDRAM 33, thereby allowing data to be outputted from the SDRAM 33 in synchronization with the reference clock.

What is claimed is:

1. A memory controller for controlling a synchronous memory, the memory controller comprising:
a reference clock generator that generates reference clocks having a predetermined frequency; and
a memory control portion that reads data from a synchronous memory in synchronization with the reference clocks in accordance with an instruction received from a CPU,
the memory control portion including:
a control command generator that outputs a control command to the synchronous memory during an output period of time; and an address signal generator that outputs an address signal to the synchronous memory during a first period of time, the first period of time including the output period of time and being longer than the output period of time.

2. A memory controller according to claim 1, wherein the address signal generator starts outputting the address signal to the synchronous memory before the control command generator starts outputting the control command to the synchronous memory and stops outputting the address signal to the synchronous memory after the control command generator stops outputting the control command to the synchronous memory.

3. A memory controller according to claim 1, further comprising a clock modulator that modulates the reference clocks to generate modulated clocks, whose frequency varies in a predetermined frequency range in which the predetermined frequency falls;

wherein the address signal generator outputs the address signal to the synchronous memory in synchronization with the modulated clocks.

4. A memory controller according to claim 1, wherein the memory control portion further includes a data controller that controls data reading operation from the synchronous memory in synchronization with the reference signals;

wherein the synchronous memory includes a clock phase adjusting portion that changes a phase of the reference clock signals supplied from the reference clock generator to the synchronous memory, thereby allowing data to be read from the synchronous memory in synchronization with the reference clock signals.

5. A memory controller according to claim 1, wherein the control command generator outputs an output period setting signal as the control command, the control command generator further outputting at least one control setting signal, the control command generator making the output period setting signal in an active state during the output period of time to make valid the at least one control setting signal and the address signal during the output period of time, the control command generator making the at least one control setting signal in an active state during a second period of time to indicate contents of the control command, the second period of time including the output period of time and being longer than the output period of time.

6. A memory controller according to claim 5, wherein the control command generator makes the control setting signal in the active state before making the output period control signal in the active state, and makes the control setting signal in a negative state after making the output period control signal in a negative state.

7. A memory controller according to claim 5, further comprising a clock modulator that modulates the reference clocks to generate modulated clocks, whose frequency varies in a predetermined frequency range in which the predetermined frequency falls;

wherein the control command generator outputs the control setting signal to the synchronous memory in synchronization with the modulated clocks; and wherein the control command generator outputs the output period control signal to the synchronous memory in synchronization with the reference clocks.

8. A memory controller according to claim 5, wherein the synchronous memory outputs at least one set of data to the memory control portion when the at least one control setting signal outputted from the control command generator to the synchronous memory indicates a request to read data from the synchronous memory.

9. A memory controller according to claim 5, wherein the memory control portion reads data from the synchronous RAM and writes data into the synchronous RAM in accordance with instructions received from the CPU.

10. A memory controller according to claim 9, wherein the synchronous memory writes at least one set of data when the at least one control setting signal outputted from the control command generator to the synchronous memory indicates a request to write data into the synchronous memory.

11. A memory device, comprising:
a CPU;
a synchronous memory operable in synchronization with external clocks; and
a memory controller that controls the synchronous memory, the memory controller including:
  a reference clock generator that generates reference clocks having a predetermined frequency; and
  a memory control portion that reads data from the synchronous memory in synchronization with the reference clocks in accordance with an instruction received from the CPU, the memory control portion including:
    a control command generator that outputs a control command to the synchronous memory during an output period of time; and
    an address signal generator that outputs an address signal to the synchronous memory during a first period of time, the first period of time including the output period of time and being longer than the output period of time.

12. A memory device according to claim 11, wherein the control command generator outputs an output period setting signal as the control command, the control command generator further outputting at least one control setting signal, the control command generator making the output period setting signal in an active state during the output period of time to make valid the at least one control setting signal and the address signal during the output period of time, the control command generator making the at least one control setting signal in an active state during a second period of time to indicate contents of the control command, the second period of time including the output period of time and being longer than the output period of time.

13. A memory device according to claim 12, wherein the synchronous memory outputs a plurality of successive sets of data to the memory control portion when the at least one control setting signal outputted from the control command generator to the synchronous memory indicates a request to read data from the synchronous memory.

14. A memory device according to claim 12, wherein the synchronous memory is a synchronous RAM, and wherein the memory control portion reads data from the synchronous RAM and writes data into the synchronous RAM in accordance with instructions received from the CPU.

15. A memory device according to claim 14,
wherein the synchronous memory is a synchronous DRAM.

16. A memory device according to claim 14,
wherein the synchronous memory writes a plurality of successive sets of data when the at least one control setting signal outputted from the control command generator to the synchronous memory indicates a request to write data into the synchronous memory.

17. An image-forming device comprising:
a CPU;
an input portion that receives image data from an external device;
a synchronous RAM that operates in synchronization with external clocks and that receives the image data;
a memory controller that writes the image data into the synchronous RAM in accordance with an instruction received from the CPU,
the memory controller including:
  a reference clock generator that generates reference clocks having a predetermined frequency; and
  a memory control portion that writes data to and reads data from the synchronous RAM in synchronization with the reference clocks in accordance with an instruction received from the CPU, the memory control portion including;
    a control command generator that outputs a control command to the synchronous memory during an output period of time; and
    an address signal generator that outputs an address signal to the synchronous RAM during a first period of time, the first period of time including the output period of time and being longer than the output period of time; and
  an image forming unit that forms images on a recording medium based on the image data.

18. An image-forming device according to claim 17, wherein the control command generator outputs an output period setting signal as the control command, the control command generator further outputting at least one control setting signal, the control command generator making the output period setting signal in an active state during the output period of time to make valid the at least one control setting signal and the address signal during the output period of time, the control command generator making the at least one control setting signal in an active state during a second period of time to indicate contents of the control command, the second period of time including the output period of time and being longer than the output period of time.

19. The image-forming device according to claim 17, wherein the image data is color image data.

* * * * *